United States Patent
Secord (10) Patent No.: US 10,501,032 B2
(45) Date of Patent: Dec. 10, 2019

(54) VEHICLE RETRACTABLE POWER INTERFACE

(71) Applicant: Toyota Motor Engineering & Manufacturing North America, Inc., Erlanger, KY (US)

(72) Inventor: Nathaniel J. Secord, Toledo, OH (US)

(73) Assignee: Toyota Motor Enigineering & Manufacturing North America, Inc., Plano, TX (US)

( * ) Notice: Subject to any disclaimer, the term of this patent is extended or adjusted under 35 U.S.C. 154(b) by 234 days.

(21) Appl. No.: 15/464,556

(22) Filed: Mar. 21, 2017

(65) Prior Publication Data

US 2018/0126932 A1    May 10, 2018

Related U.S. Application Data

(60) Provisional application No. 62/418,452, filed on Nov. 7, 2016.

(51) Int. Cl.
| | |
|---|---|
| *B60L 1/00* | (2006.01) |
| *B60L 3/00* | (2019.01) |
| *H02G 3/00* | (2006.01) |
| *B60R 16/03* | (2006.01) |
| *H02M 7/44* | (2006.01) |
| *H01R 13/72* | (2006.01) |
| *H01R 25/00* | (2006.01) |
| *H01R 27/02* | (2006.01) |

(52) U.S. Cl.
CPC ............. *B60R 16/03* (2013.01); *H01R 13/72* (2013.01); *H01R 25/003* (2013.01); *H01R 27/02* (2013.01); *H02M 7/44* (2013.01); *H01R 2201/26* (2013.01)

(58) Field of Classification Search
CPC ...... B60R 16/03; H01R 13/72; H01R 25/003; H01R 27/02; H01R 2201/26; H02M 7/44
USPC .......................................................... 307/9.1
See application file for complete search history.

(56) References Cited

U.S. PATENT DOCUMENTS

| | | | |
|---|---|---|---|
| 6,379,178 | B1 | 4/2002 | Jones, III et al. |
| 8,104,816 | B2 | 1/2012 | Lupton, III et al. |
| 9,180,803 | B2 | 11/2015 | Cleary et al. |
| 2005/0151422 | A1 | 7/2005 | Gilmour |
| 2006/0276236 | A1* | 12/2006 | Krieger ............... B60R 11/02 455/573 |
| 2018/0072252 | A1* | 3/2018 | Collins ............... B60L 58/12 |

* cited by examiner

*Primary Examiner* — Rexford N Barnie
*Assistant Examiner* — Toan T Vu
(74) *Attorney, Agent, or Firm* — Christopher G. Darrow; Darrow Mustafa PC (57) ABSTRACT

A retractable power interface includes a plurality of power ports, such as a 12 volt DC port, a 120 volt AC port, and a USB port. The power interface may be located in a variety of locations on a vehicle, such as in the interior of a truck bed, the tailgate of a truck bed, and a rear bumper. The power interface is coupled to the vehicle power by a retractable cord. The power interface may be removed from a stationary position or location and moved to a convenient location. The cord may automatically retract when it is desired to return the power interface to the stationary position. The retractable power interface may be located in the interior sidewalls of a truck bed, the interior side or top of a tailgate, and/or in the rear bumper.

20 Claims, 8 Drawing Sheets

VEHICLE RETRACTABLE POWER INTERFACE

CROSS REFERENCE TO RELATED APPLICATIONS

This application claims the benefit of U.S. Provisional Application No. 62/418,452, filed on Nov. 7, 2016, which is incorporated herein by reference in its entirety.

FIELD

The subject matter described herein relates in general to power interfaces and, more particularly, to vehicle retractable power interfaces.

BACKGROUND

Modern vehicles have power interfaces. A traditional power interface is a 12 volt socket that has been commonly used for a lighter plug. Adapters can fit into the plug to transmit the 12 volt power. A recent power interface includes a universal serial bus (USB) port. The USB port can be used to connect a device to the on-board audio system. The USB port may also serve as a power port. Some vehicles also provide a 120 volt AC socket. An on-board power inverter converts the vehicle 12 volt DC power into a 120 volt AC power. The various power interfaces are typically located in fixed positions on the vehicle. Is some vehicles, the power interface may be on a retractable cord that allows the power interface to be removed from a stationary position in the vehicle and then retracted back into the stationary position at a later time.

Existing power interfaces, however, do not provide the variety of power connections expected by vehicle users. Additionally, the current retractable power interfaces are limited in their locations and do not meet the needs of modern vehicle owners.

SUMMARY

A retractable power interface includes a plurality of power ports, such as a 12 volt DC port, a 120 volt AC port, and a USB port. The power interface may be located in a variety of locations on a vehicle, such as in the interior of a truck bed, the tailgate of a truck bed, and a rear bumper. The power interface is coupled to the vehicle power by a retractable cord. The power interface may be removed from a stationary position or location and moved to a convenient location. The cord may automatically retract when it is desired to return the power interface to the stationary position. The retractable power interface may be located in the interior sidewalls of a truck bed, the interior side or top of a tailgate, and/or in the rear bumper.

In one respect, the present disclosure is directed to a vehicle retractable power interface having a plurality of different power ports. A cord electrically couples the power interface to a DC power source on the vehicle. A retraction mechanism is operable to allow the cord to be extended and retracted from a stationary location on the vehicle. A first one of the power ports is the same as the power source. A second one of the power ports is an AC power port. A third one of the power ports is a different voltage from the power source.

In another respect, the present disclosure is directed to a vehicle. The vehicle has a DC power source and a structural component with an opening therein. The vehicle includes a retractable power interface having a plurality of different power ports and removably disposed in the opening. A cord electrically couples the power interface to the power source. A retraction mechanism is operable to allow the cord to be extended and retracted from the opening. A first one of the power ports is the same as the power source. A second one of the power ports is an AC power port. A third one of the power ports is a different voltage from the power source.

In yet another respect, the present disclosure is directed to a vehicle having a truck bed with a pair of sidewalls and a tailgate. There is a DC power source and a retractable power interface having a plurality of different power ports. The retractable power interface is removably disposed in at least one of the sidewall and the tailgate. A cord electrically couples the power interface to the power source. A retraction mechanism is operable to allow the cord to be extended and retracted from the at least one of the sidewall and the tailgate. A first one of the power ports is the same as the power source. A second one of the power ports is an AC power port. A third one of the power ports is a different voltage from the power source.

DETAILED DESCRIPTION

This detailed description relates to retractable power interface that includes a plurality of power ports, such as a 12 volt DC port, a 120 volt AC port, and a USB port. The power interface may be located in a variety of locations on a vehicle, such as in the interior of a truck bed, the tailgate of a truck bed, and a rear bumper. The power interface is coupled to the vehicle power by a retractable cord. The power interface may be removed from a stationary position or location and moved to a convenient location. The cord may automatically retract when it is desired to return the power interface to the stationary position. The retractable power interface may be located in the interior sidewalls of a truck bed, the interior side or top of a tailgate, and/or in the rear bumper.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
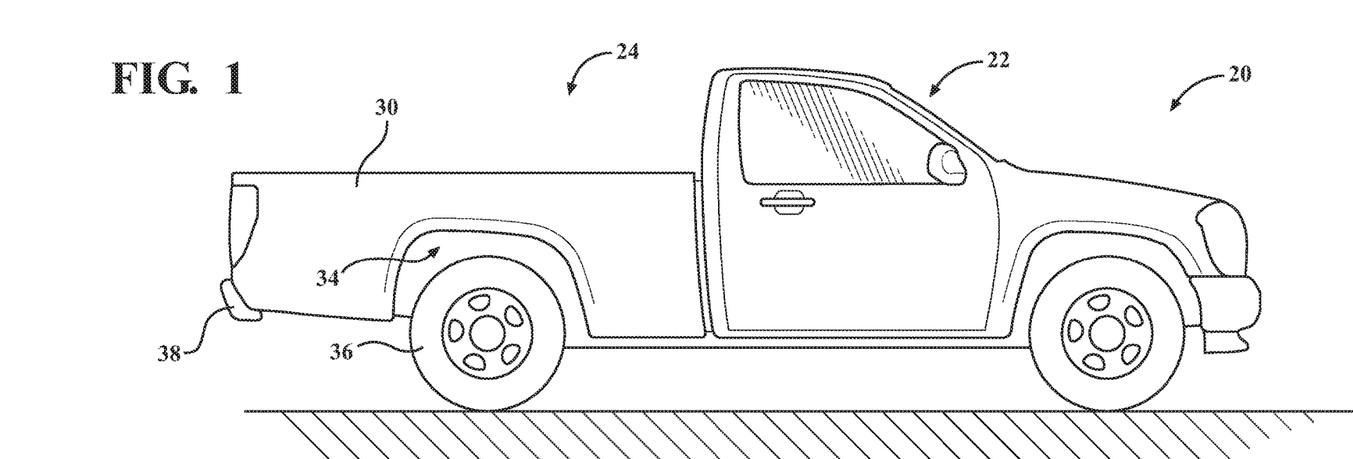
FIGS. 1 and 2 are respective side and top plan views of an exemplary vehicle having a retractable power interface.
Figure 2:
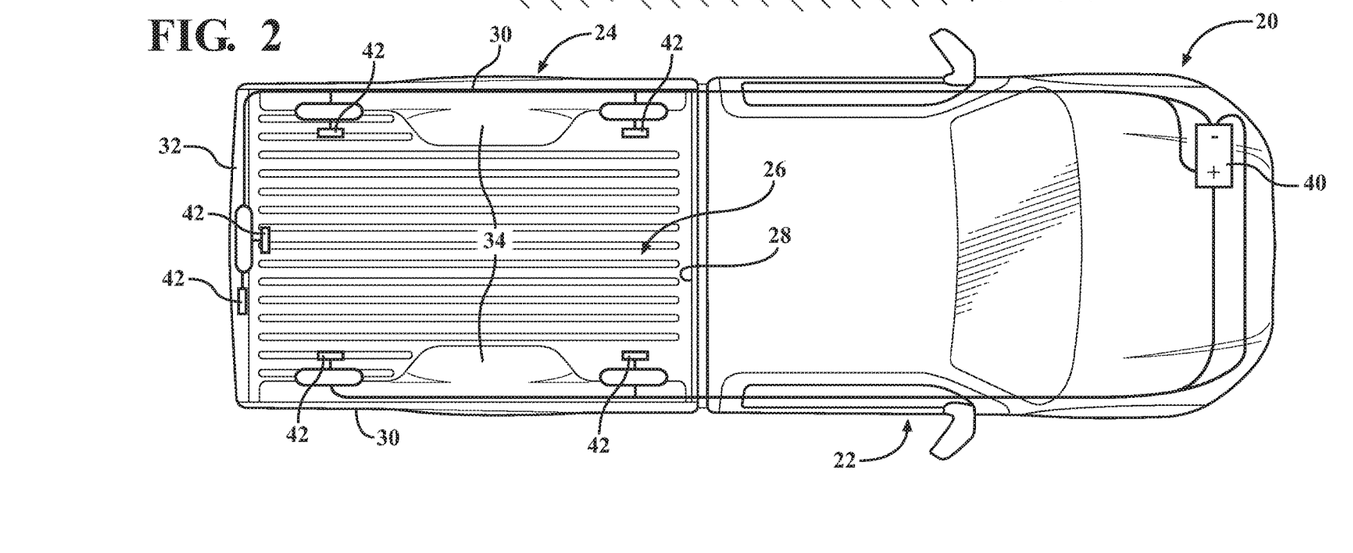
Figure 3:
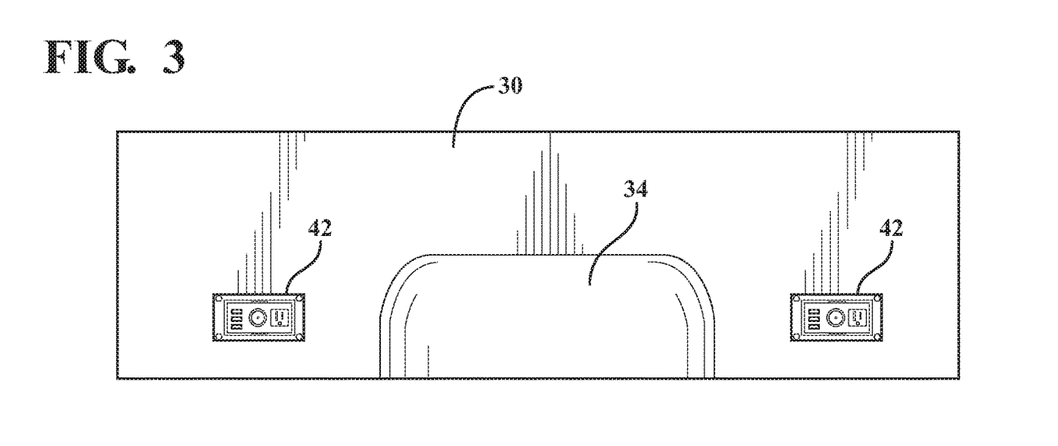
FIG. 3 is a view of an interior sidewall of the truck bed of the vehicle of FIGS. 1 and 2.

Referring to FIGS. 1 and 2, an example of a vehicle 20 is shown. As used herein, "vehicle" means any form of motorized transport. In one or more implementations, the vehicle 20 can be an automobile. While arrangements will be described herein with respect to automobiles, it will be understood that embodiments are not limited to automobiles. In some implementations, the vehicle 20 may be a watercraft, an aircraft, a train, a space craft or any other form of motorized transport.

The vehicle 20 can be a truck with a cab 22 having an interior that can be configured to transport one or more vehicle occupants and a bed 24 rearward of cab 22. Bed 24 may have a floor 26, a front wall 28, and a pair of spaced apart sidewalls 30 extending rearwardly from front wall 28. A tailgate 32 can form the rear portion of bed 24. Bed 24 may include wheel wells 34 to accommodate rear wheels 36 of vehicle 20. Vehicle 20 may have a rear bumper 38 adjacent tailgate 32. Vehicle 20 has a DC power source 40, such as a 12 volt battery.

Figure 7:
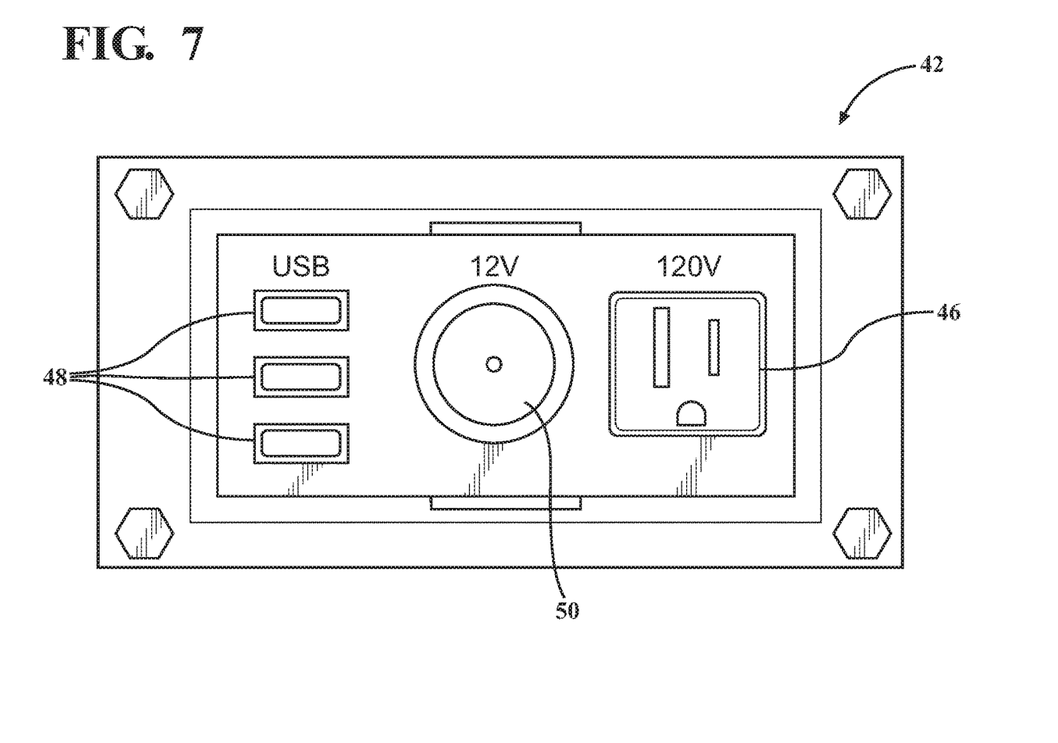
FIG. 7 is a plan view of an exemplary retractable power interface.
Figure 14:
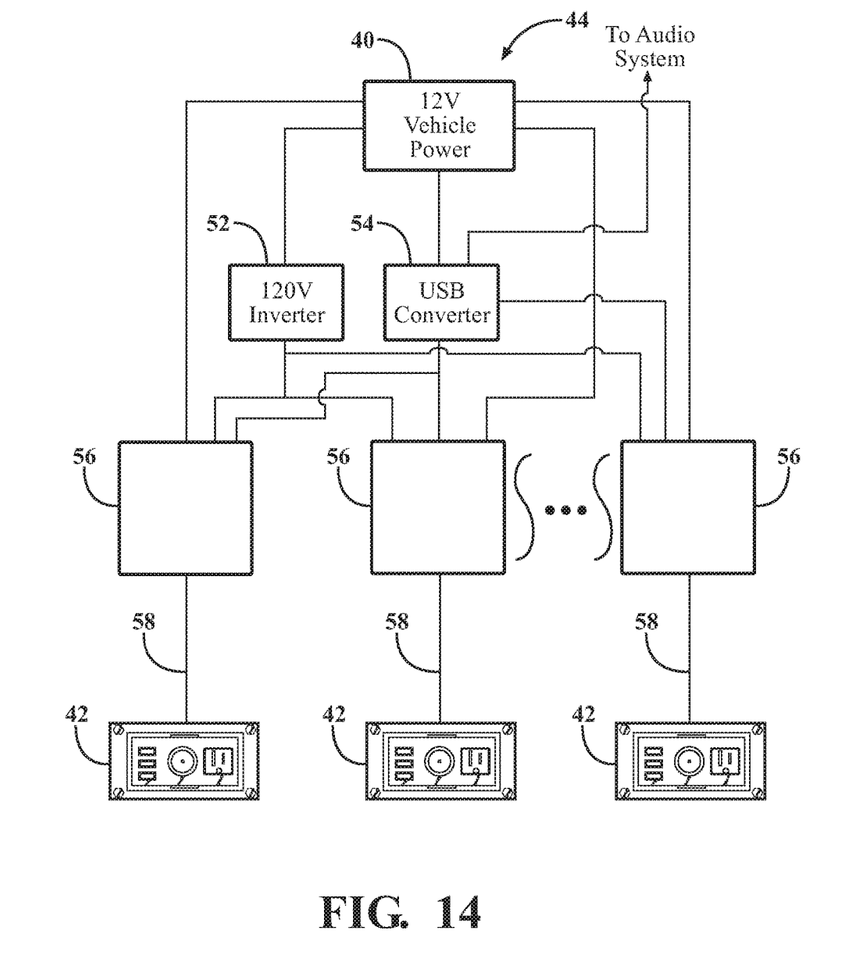
FIGS. 14 and 15 are exemplary schematic views retractable power interface systems.
Figure 15:
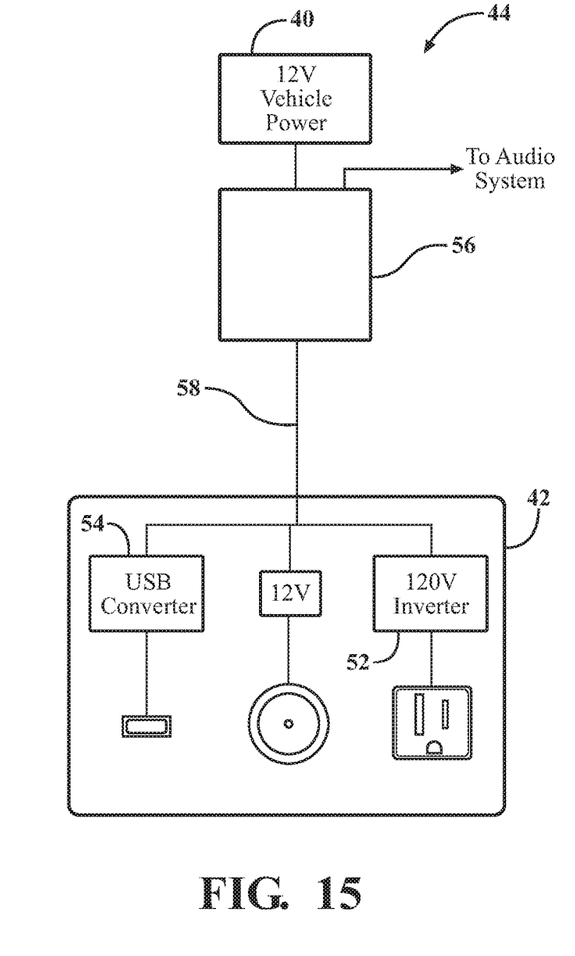

Vehicle 20 includes one or more retractable power interfaces 42 that are part of a power system 44 of vehicle 20. Referring to FIGS. 7 and 14-15, retractable power interface 42 includes a plurality of sockets to provide power in varying forms, such as 120 volt AC, 5 volt DC and 12 volt DC by way of non-limiting example. In one or more arrangements, retractable power interface 42 may include an AC socket 46, one or more USB ports 48, and a cigarette lighter socket 50. AC socket 46 may provide 120 volt AC power, USB ports 48 may provide 5 volt DC power, and cigarette lighter socket 50 may provide 12 volt DC power by way of non-limiting example. To provide the power in varying forms, system 44 includes at least one power inverter 52 and at least one converter 54 each electrically coupled to power source 40. Inverter 52 is operable to supply an AC voltage, such as 120 volt AC, using the DC voltage of power source 40. Converter 54 is operable to supply a DC voltage, such as 5 volt DC, using the DC voltage of power source 40. USB ports 48 may also be electrically coupled to the audio system aboard vehicle 20 to allow communication between a device connected to a USB port 48 and the audio system.

A retractable cord mechanism 56 is associated with each retractable power interface 42. Each mechanism 56 has a cord 58 electrically coupled to retractable power interface 42. Cord 58 is operable to supply power to retractable power interface 42. Cord 58, as described below, may supply power only from power source 40 or may also supply power from inverter 52 and converter 54. Cord 58 may be pulled from mechanism 56 to allow retractable power interface 42 to be moved from a stationary location to a desired location. Cord 58 may subsequently be retracted back into mechanism 56 when returning retractable power interface 42 to its stationary location.

In one or more arrangements, such as that shown in FIG. 14, system 44 may utilizes a single inverter 52 and single converter 54 to supply the associated power to one or more retractable power interfaces 42. In these arrangements, inverter 52, converter 54 and power source 40 are each electrically coupled to a cord 58 associated with each mechanism 56 and cord 58 provides the three different power sources to its associated retractable power interface 42. Specifically, cord 58 electrically couples the output of inverter 52 to AC socket 46, the output of converter 54 to USB ports 48, and power source 40 to cigarette socket 50.

In one or more arrangements, such as that shown in FIG. 15, system 44 utilizes a plurality of inverters 52 and a plurality of converters 54. In these arrangements, an inverter 52 and a converter 54 are associated with each retractable power interface 42. Cord 58 is operable to electrically couple retractable power interface 42 to power source 40. Specifically, cord 58 electrically couples inverter 52 and converter 54 in the associated retractable power interface 42 to power source 40. Cord 58 also electrically couples cigarette socket 50 to power source 40. Within each retractable power interface 42 the output of inverter 52 is coupled to AC socket 46 and the output of converter 54 is coupled to USB ports 48.

Figure 16:
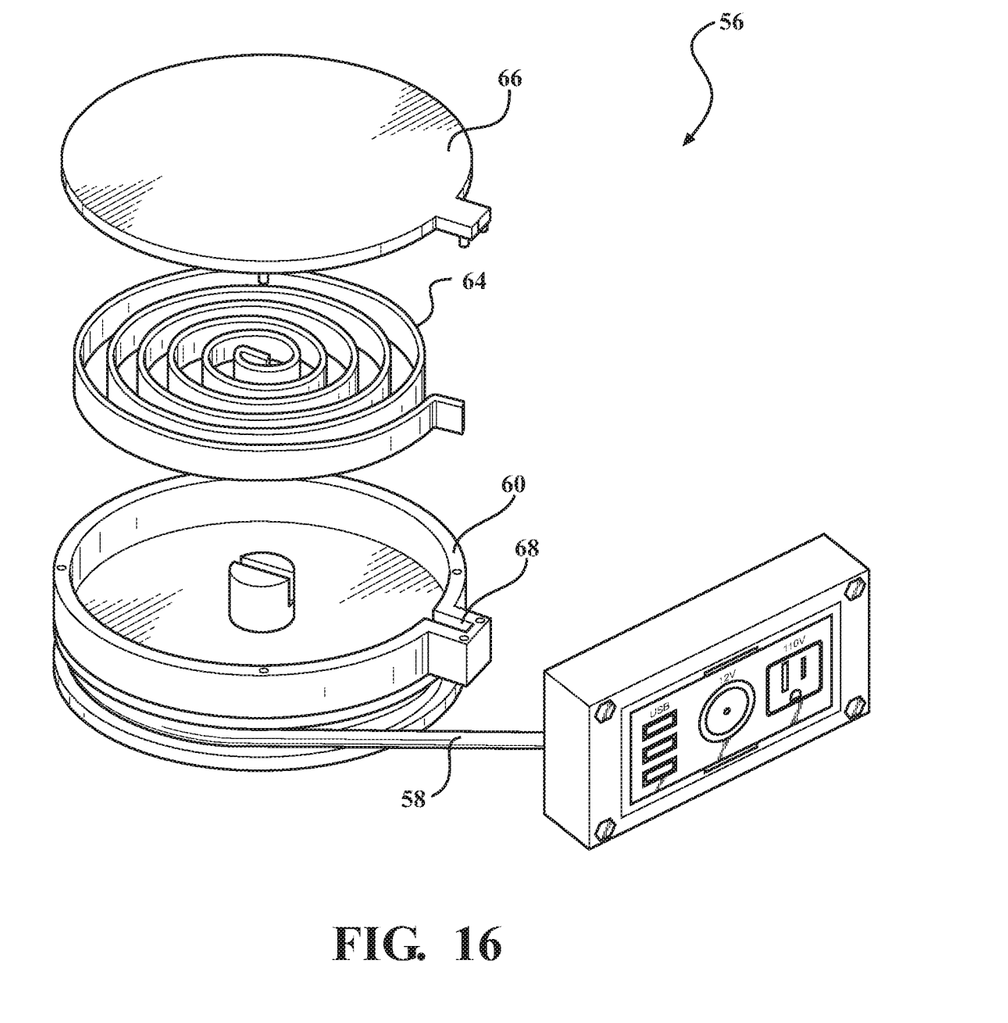
FIG. 16 is an exploded view of an exemplary retraction mechanism.

Mechanism 56 operates on a principle similar to that of known retractable mechanisms, such as a tape measure, seat belt, or other known retractable cord, strap, or tape type devices. As such, mechanism 56 may take a variety of forms. For example, in one or more arrangements, mechanism 56 may take the form shown in FIG. 16. Each retractable power interface 42 is connected to a power cord 58 of up to several feet in length. Cord 58 may electrically connect at one end to retractable power interface 42 with a wire harness in known fashion, for example using standard male/female wire harness connectors. A bulk of cord 58 may be wound around a spring-loaded spool 60 mounted at a convenient in vehicle 20 adjacent the stationary location of its associated retractable power interface 42. Spool 60 may be supported on and rotate around a post 62 which extends into the interior of spool 60 to lockingly engage one end of a flat coil spring 64 contained by spool cover 66, while the other end of flat coil spring 64 is secured in a recess or receptacle 68 in the spool 60. As retractable power interface 42 is pulled from its stationary location to a more convenient location for the user, spool 60 rotates and progressively winds spring 64 under tension so that its tendency is to pull the retractable power interface 42 back into the stationary location by the force of spring 64. Mechanism 56 allows retractable power interface 42 to be returned easily without the user having to stuff slack cord 58 into the stationary location receptacle of retractable power interface 42 and allows a light tension to be maintained on cord 58 to eliminate slack while the retractable power interface 42 is removed from its stationary location.

It will be understood by those skilled in the art that mechanism 56 could be provided with a rack or ratchet mechanism of known type to lock spool 60 in place at a pulled position, somewhat in the manner of a tape measure or a window shade, which lock would be released upon a quick outward tug and sudden release of retractable power interface 42 in the direction of mechanism 56 in a manner well-known to those skilled in the art. It will further be understood that while a particular example of a retracting mechanism is shown for purposes of illustration in FIG. 16, virtually any known retracting mechanism for cord-like objects could be used.

Figure 10:
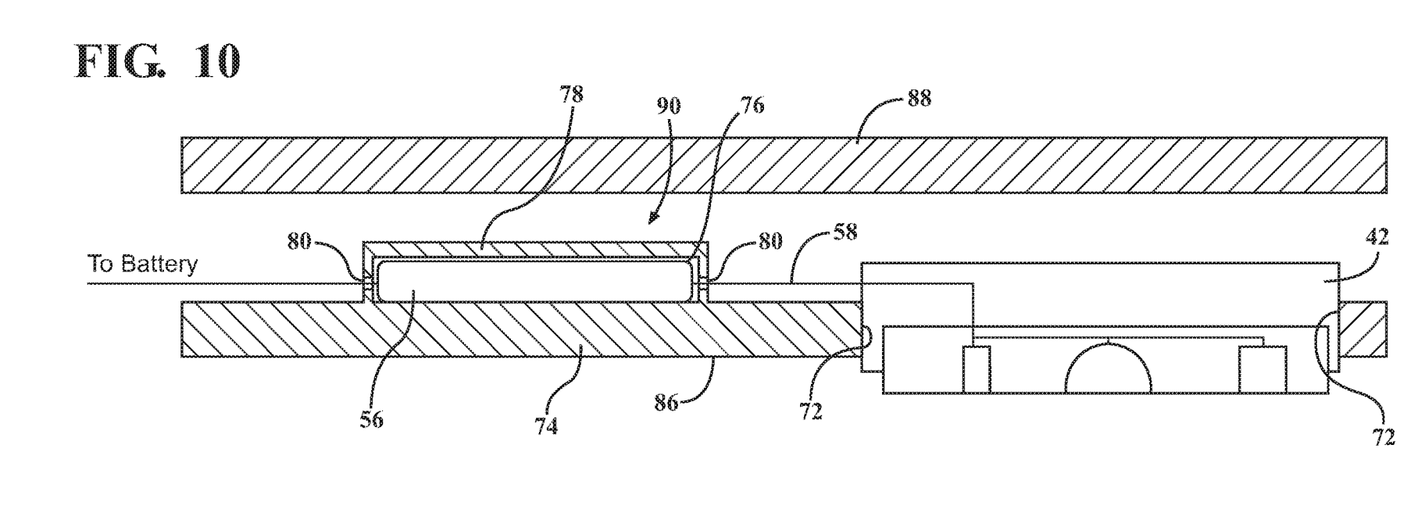
FIGS. 10 and 11 are cut-away views depicting the retractable power interface system.
Figure 11:
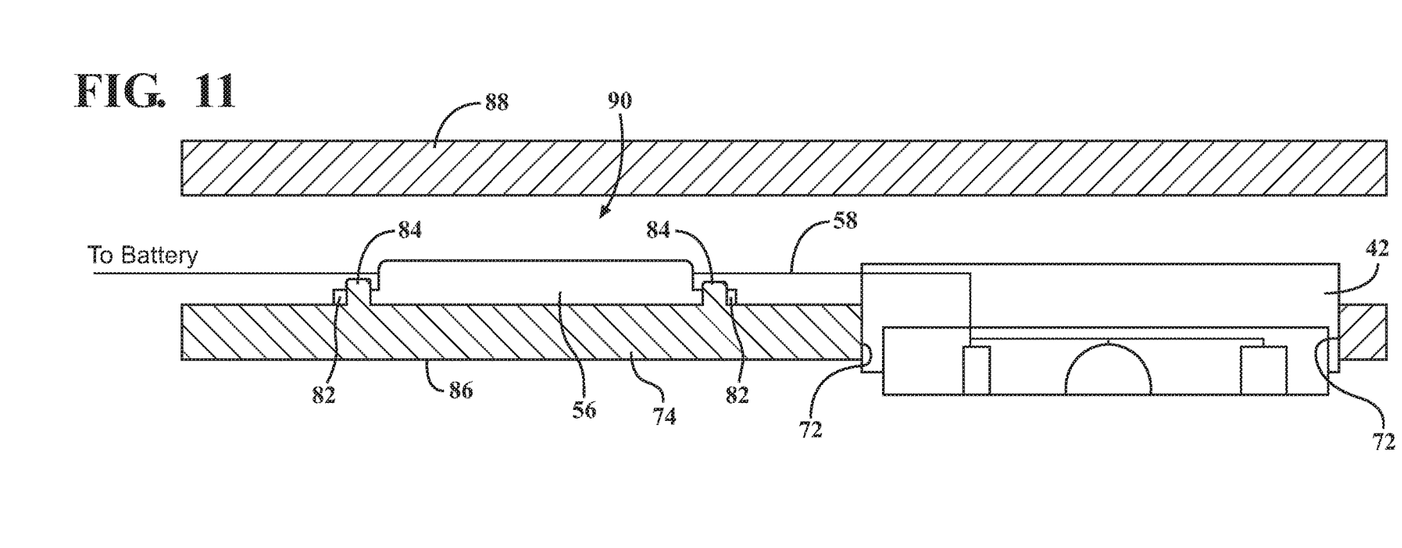

Referring to FIGS. 10 and 11, in one or more arrangements, retractable power interface 42 may be positioned in stationary locations 70 throughout vehicle 20. Vehicle 20 may include a plurality of stationary locations 70 such that multiple retractable power interfaces 42 are located throughout vehicle 20. Each stationary location 70 may include an opening 72 in a wall or structural component 74 of vehicle 20. For example, structural component 74 may be front wall 28, sidewall 30, tailgate 32, or bumper 38. Opening 72 is configured to receive retractable power interface 42. Retractable power interface 42 along with cord 58 may be selectively removed from and positioned back into opening 72. Mechanism 56 may be affixed to a back side of structural component 74 such that it is hidden from view. In one or more arrangements, such as that shown in FIG. 10, mechanism 56 may be disposed in a recess 76 formed by a frame 78 coupled to the back side of structural component 74. Frame 78 may have openings 80 for cord 58 and the wiring to power source 40 and, optionally to the audio system of vehicle 20. In one or more arrangements, such as that shown in FIG. 11, mechanism 56 may include mounting flanges 82 that are received within retention tabs 84 coupled to the back side of structural component 74. In one or more arrangements, structural component 74 includes a inner wall 86, an outer wall 88 with a space 90 therebetween. In these arrangements, opening 72 may be in inner wall 86 with mechanism 56 located within space 90 and hidden from view. By way of non-limiting example, inner wall 86 may be the bed 24 facing wall of front wall 28, sidewall 30 and/or tailgate 32 while outer wall 88 may be the outwardly facing (from bed 24) wall of front wall 28, sidewall 30 and/or tailgate 32, respectively. It should be appreciated that opening 72 may be a partial opening or a recess in structural component 74 and will include a path for cord 58 to be moved between a retracted and extended state.

Figures 8, 9:
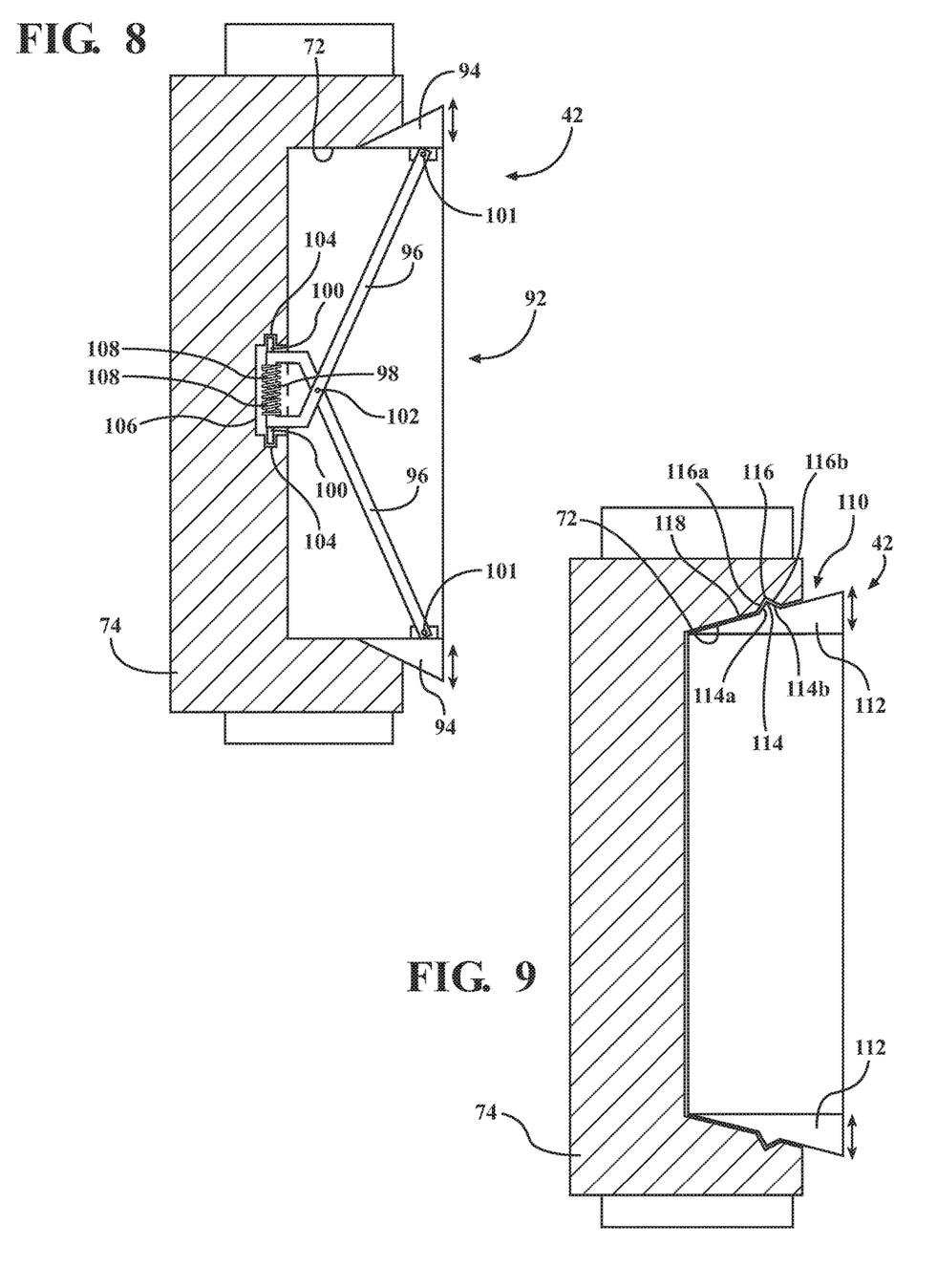
FIGS. 8 and 9 are views of exemplary retention mechanisms that allow the retractable power interface to be retained in and removed from a stationary location in the vehicle of FIGS. 1 and 2.

Referring to FIGS. 8 and 9, retractable power interface 42 may be configured to be selectively removed from and inserted into opening 72. Various mechanisms may be utilized to allow retractable power interface 42 to be retained in opening 72 and selectively removed therefrom and returned thereto.

In one or more arrangements, such as that shown in FIG. 8, a retention mechanism 92 allows retractable power interface 42 to be selectively removed from and inserted into opening 72. Retention mechanism 92 includes a pair of push tabs 94, a pair of arms 96, a biasing member 98 and a pair of retention pins 100. Push tabs 94 may be pivotally mounted to opposite sides of retractable power interface 42 such that they may be squeezed toward one another. One end of each arm 96 may be pivotally coupled to a separate tab 94 at pivot 101 while the other end of each arm 96 is coupled to a separate pin 100. Arms 96 are pivotally coupled together at pivot 102. Pins 100 are configured to fit within bores 104 in a recess 106 of structural component 74. Biasing member 98 bias pins 100 into the associate bore 104. Biasing member 98, by way of non-limiting example may be a spring disposed around projections 108 on each arm 96. To remove retractable power interface 42 from opening 72, tabs 84 may be squeezed toward one another, which causes pins 100 to move toward one another at out of bores 104 as arms 96 pivot about pivot 102 against the bias of biasing member 98 to release retractable power interface 42 from opening 72. With pins 100 removed from bores 104, retractable power interface 42 may be removed from opening 72 and cord 58 extended from mechanism 56. To return retractable power interface 42 to its stationary location, tabs 84 may be squeezed toward one another while inserting retractable power interface 42 back into opening 72. Mechanism 56 retracts cord 58 as retractable power interface 42 is moved into opening 72. When fully positioned within opening 72, release of tabs 84 allows biasing member 98 to move pins 100 away from one another and into bores 104 to retain retractable power interface 42 within opening 72. It should be appreciated that in one or more arrangements, ramped or cam surfaces may be provided adjacent bores 104 to allow a user to simply push retractable power interface 42 into opening 72 without necessitating the pushing of tabs 94 toward one another. In these arrangements, pins 100 will ride along the ramped or cam surfaces causing pins 100 to move toward one another until pins 100 are aligned with bores 104 and biasing member 98 pushes pins 100 away from one another and into bores 104.

In one or more arrangements, such as that shown in FIG. 9, a retention mechanism 110 allows retractable power interface 42 to be selectively removed from and inserted into opening 72. Retention mechanism 110 includes a pair of push tabs 112 pivotally mounted to opposite sides of retractable power interface 42 such that they may be squeezed toward one another. Each tab 112 includes an engagement feature 114 that is configured to engage in a complementary recess 116 in a wall 118 structural component 74. In one or more arrangements, engagement feature 114 may be a tapered feature having a ramped leading surface 114a and a ramped trailing surface 114b. Recesses 116 may have a complementary tapered shape with a ramped surfaces 116a, 116b. Tabs 112 may be biased away from one another such that engagement features 114 are biased outwardly from retractable power interface 42. To remove retractable power interface 42 from opening 72, tabs 112 may be squeezed toward one another which causes engagement features 114 to move toward one another and out of recesses 116. With engagement features 114 free of recesses 116, retractable power interface 42 may be removed from opening 72 and cord 58 extended from mechanism 56. To return retractable power interface 42 to its stationary location, tabs 112 may be squeezed toward one another while inserting retractable power interface 42 back into opening 72. Mechanism 56 retracts cord 58 as retractable power interface 42 is moved into opening 72. When fully positioned within opening 72, the release of tabs 112 allows the biasing of tabs 112 to move engagement features 114 into recesses 116 to retain retractable power interface 42 within opening 72. It should be appreciated that in one or more arrangements, ramped surfaces 112a, 112b, 116a, and 116b allow a user to simply push retractable power interface 42 into opening 72 without necessitating the pushing of tabs 112 toward one another. In these arrangements, engagement features 114 will ride along wall 118 until aligned with recesses 116 and the biasing of tabs 112 causes engagement features 114 to engage with recesses 116 and retain retractable power interface 42 in opening 72.

Figure 12:
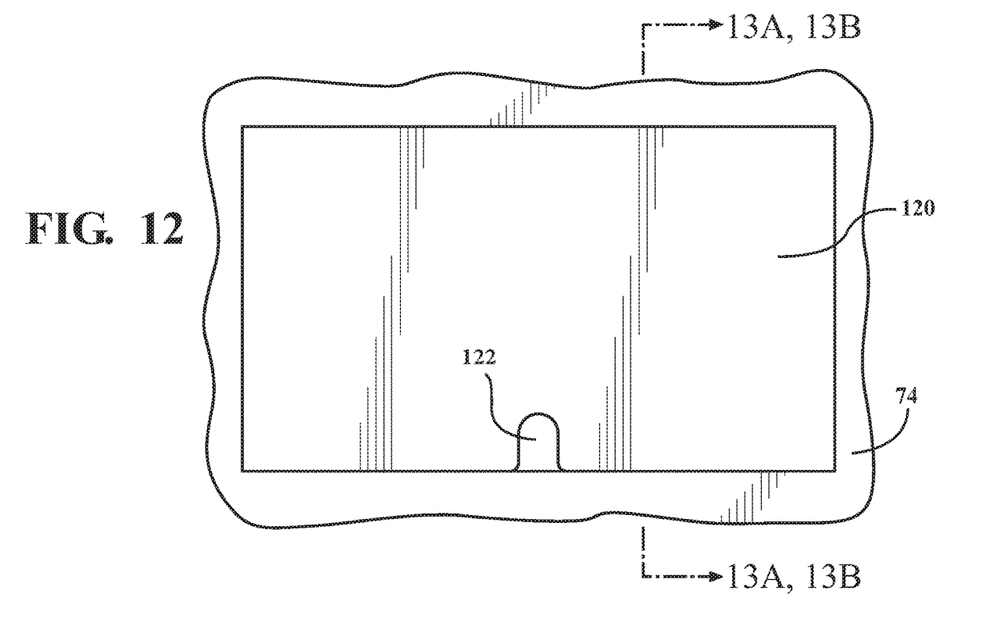
FIG. 12 is a front plan view of a cover for the retractable power interface.
Figure 13A:
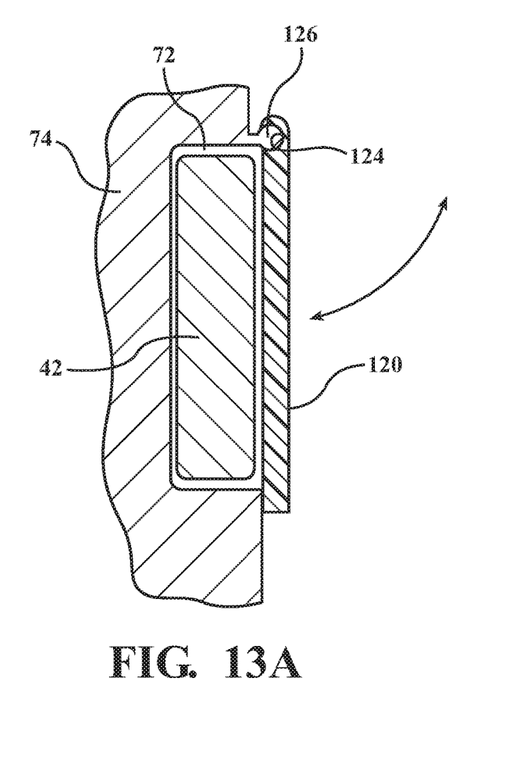
FIGS. 13A and 13B are cross-sectional views of the cover of FIG. 12 illustrating exemplary covers for the retractable power interface.
Figure 13B:
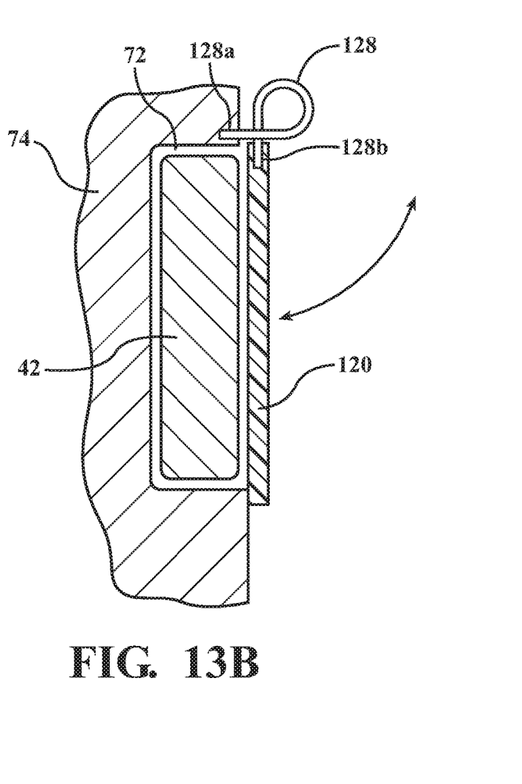

Referring now to FIGS. 12, 13A, and 13B, a cover 120 may be utilized to cover up and/or protect retractable power interface 42 when disposed in opening 72. Cover 120 may be coupled to structural component 74 adjacent opening 72 and be moveable relative thereto to allow retractable power interface 42 to be removed from and inserted into opening 72. Cover 120 may include a slot 122 configured to allow cord 58 to extend through opening 72 when retractable power interface 42 is removed therefrom and cover 120 is covering opening 72.

In one or more arrangements, such as that shown in FIG. 13A, cover 120 may include a retention feature 124, such as a recess, that is configured to engage with a projection 126 on structural component 74 adjacent opening 72. For example, projection 126 may have a generally circular cross-section that fits within a complementary retention feature 124. The engagement may be a press-fit or a sliding fit wherein retention feature 124 is aligned with projection 126 and slid relative thereto to position projection 126 within retention feature 124. Engagement of projection 126 with retention feature 124 may allow cover 120 to pivot about projection 126 to allow retractable power interface 42 to be removed from and inserted into opening 72. In one or more arrangements, cover 120 may be flexible such that pivoting about projection 126 is not required to move cover relative to opening 72.

In one or more arrangements, such as that shown in FIG. 13B, cover 120 may be movably coupled to structural component 74 with a biasing member 128. Biasing member 128 may be configured to allow cover 120 to move relative to structural component 74 to allow retractable power interface 42 to be removed from and inserted into opening 72. In one or more arrangements, biasing member 128 may be a torsion spring with one end 128a coupled to structural component 74 and the other end 128b coupled to cover 120. In these arrangements, biasing member 128 biases cover 120 to cover opening 72 while allowing cover 120 to be pivoted to an open position allowing retractable power interface 42 to be removed from and inserted into opening 72.

Figure 4:
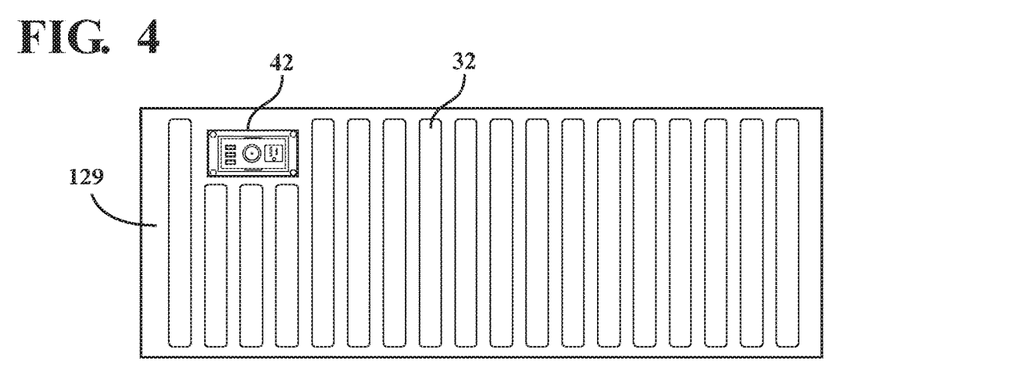
FIGS. 4 and 5 are respective interior and top views of the tailgate of the truck bed of the vehicle of FIGS. 1 and 2.
Figure 5:
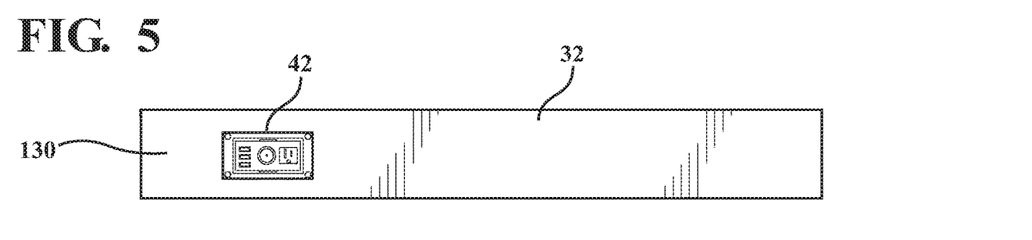
Figure 6:
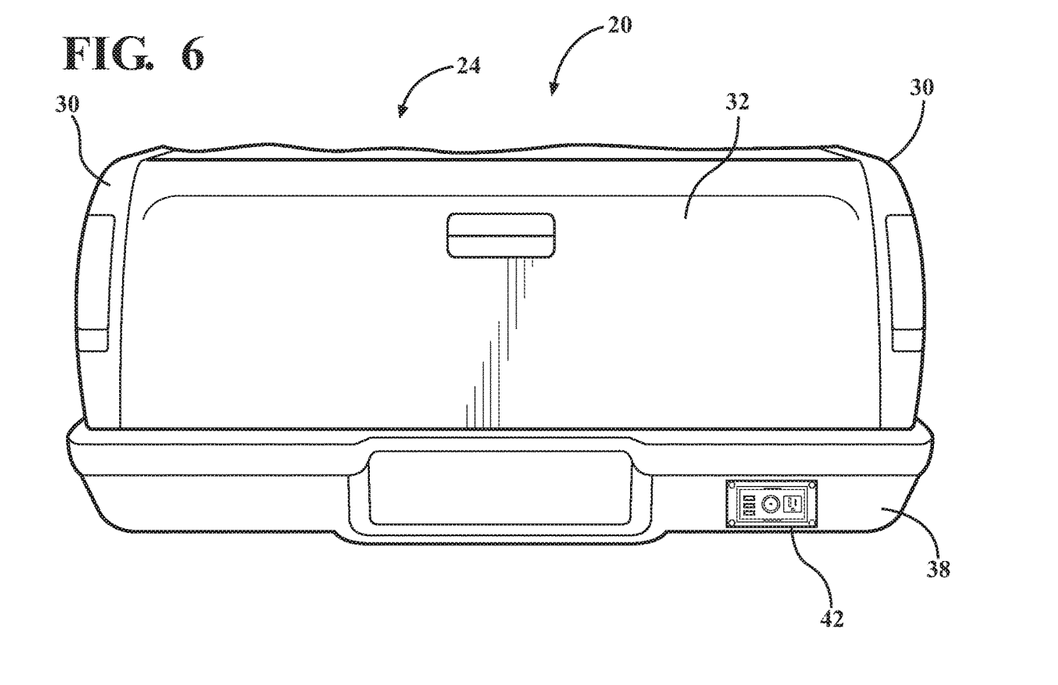
FIG. 6 is a fragmented rear view of the vehicle of FIGS. 1 and 2.

In one or more arrangements, retractable power interface 42 is advantageously located at convenient stationary locations on vehicle 20 from which it may be extended and retracted back into. Referring to FIGS. 2-5, retractable power interface 42 may be located at various positions along bed 24, such as in sidewalls 30 and tailgate 32. In one or more arrangements, a retractable power interface 42 may be located in one or both sidewalls 30 forward and/or rearward of wheel well 34, such as the locations shown in FIG. 3. In one or more arrangements, a retractable power interface 42 may be located on the interior facing surface 129 of tailgate 32, such as shown in FIG. 4. In one or more arrangements, a retractable power interface 42 may be located on an upper surface 130 of tailgate 32, such as shown in FIG. 5. In one or more arrangement, a retractable power interface 42 may be located exterior to bed 24, such as in rear bumper 38, as shown in FIG. 6. These various locations advantageously provide the variety of power sources at convenient locations exterior to cab 22 and the passenger compartment therein. These locations facilitate the powering of accessories with retractable power interface 42 while outside of cab 22. Moreover, the locations in bed 24 allow for devices in bed 24 to be easily connected to power source 40 via one or more of the retractable power interface 42. Location of a retractable power interface 42 on upper surface 130 of tailgate 32 may advantageously provide a convenient power source when tailgate 32 is down (horizontal). In that position, the retractable power interface 42 will face rearwardly toward a user behind vehicle 20 thereby enabling easy access from outside of bed 24. Similarly, location of retractable power interface 42 in rear bumper 38 also enables easy access from outside of bed 24.

It will be appreciated that arrangements described herein can provide numerous benefits, including one or more of the benefits mentioned herein. For example, arrangements described herein can provide convenient locations for power interfaces. Additionally, the power interfaces can be retractable to easily allow the power interface to be removed from a stationary location for use at a more useable location and then retracted back into the stationary location. Moreover, the power interface provides three different interfaces to allow connection of a variety of accessories.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC). The term "operatively connected" as used throughout this description, can include direct or indirect connections, including connections without direct physical contact.

Aspects herein can be embodied in other forms without departing from the spirit or essential attributes thereof. Accordingly, reference should be made to the following claims, rather than to the foregoing specification, as indicating the scope of the invention. It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means plus-function format and are not intended to be interpreted based on 35 U.S.C. 112, sixth paragraph, unless and until such claim limitations expressly use the phrase "means for" followed by a statement of function void of further structure.

What is claimed is:

1. A vehicle retractable power interface comprising:
a power interface having a plurality of different power ports;
a cord electrically coupling the power interface to a DC power source on a vehicle; and
a retraction mechanism operable to allow the cord to be extended and retracted from a stationary location on the vehicle,
wherein the retraction mechanism is configured to be disposed in an interior space of at least one of a pair of sidewalls of a truck bed and a tailgate of the truck bed, both the sidewalls and the tailgate having an inner wall and an outer wall in the interior space, wherein the retraction mechanism is configured to be mounted to at least one of the inner wall and the outer wall thereof, wherein the retraction mechanism is sized to contact one of the inner wall and the outer wall, and wherein a first one of the power ports is the same as the power source, a second one of the power ports is an AC power port, and a third one of the power ports is a different voltage from the power source.

2. The vehicle retractable power interface of claim 1, further comprising a power inverter converting the DC power source to an AC power source, the power inverter electrically coupled to the AC power port.

3. The vehicle retractable power interface of claim 2, further comprising a power converter converting the DC power source to a different voltage, the power converter electrically coupled to the third one of the power ports.

4. The vehicle retractable power interface of claim 3, wherein the third one of the power ports is a USB port.

5. The vehicle retractable power interface of claim 4 wherein the USB port is electrically coupled to an audio system of the vehicle.

6. A vehicle comprising:
a DC power source;
a structural component having an opening therein;
a retractable power interface having a plurality of different power ports, the retractable power interface removably disposed in the opening;
a cord electrically coupling the power interface to the power source; and
a retraction mechanism operable to allow the cord to be extended and retracted from the opening,
wherein the retraction mechanism is configured to be disposed in an interior space of at least one of a pair of sidewalls of a truck bed and a tailgate of the truck bed, both the sidewalls and the tailgate having an inner wall and an outer wall in the interior space,
wherein the retraction mechanism is configured to be mounted to at least one of the inner wall and outer wall thereof,
wherein the retraction mechanism is sized to contact one of the inner wall and the outer wall, and
wherein a first one of the power ports is the same as the power source, a second one of the power ports is an AC power port, and a third one of the power ports is a different voltage from the power source.

7. The vehicle of claim 6, further comprising a power inverter converting the DC power source to an AC power source and a power converter converting the DC power source to a different voltage, wherein the power inverter is electrically coupled to the AC power port, the power converter is electrically coupled to the third one of the power ports, and the third one of the power ports is a USB port.

8. The vehicle of claim 7, wherein the power inverter and the power converter are electrically disposed between the retraction mechanism and the power ports.

9. The vehicle of claim 6, wherein the opening is in one of the sidewalls.

10. The vehicle of claim 6, wherein the opening is in the tailgate, and the retractable power interface is disposed in the opening.

11. The vehicle of claim 10, wherein the opening is in an upper surface of the tailgate.

12. The vehicle of claim 10, wherein the opening is in a wall of the tailgate facing the truck bed.

13. The vehicle of claim 6, further comprising a rear bumper and wherein the opening is in the rear bumper, the retractable power interface is disposed in the opening, and the retraction mechanism is on an interior of the rear bumper.

14. A vehicle comprising:
a truck bed having a pair of sidewalls and a tailgate, the sidewalls and the tailgate including an inner wall and an outer wall defining an interior space therebetween;
a DC power source;
a retractable power interface having a plurality of different power ports, the retractable power interface removably disposed in at least one of the sidewall and the tailgate;
a cord electrically coupling the power interface to the power source; and
a retraction mechanism disposed in the interior space of the at least one of the sidewalls and the tailgate, mounted to at least one of the inner wall and the outer wall thereof, and sized to contact one of the inner wall and the outer wall,
wherein the retraction mechanism is operable to allow the cord to be extended and retracted from the at least one of the sidewall and the tailgate,
wherein a first one of the power ports is the same as the power source, a second one of the power ports is an AC power port, and a third one of the power ports is a different voltage from the power source.

15. The vehicle of claim 14, wherein the retractable power interface is removably disposed in at least one of an upper surface of the tailgate and an interior surface of the tailgate.

16. The vehicle of claim 14, wherein the retractable interface is removably disposed in at least one of the sidewalls.

17. The vehicle of claim 14, wherein the retraction mechanism is disposed in a recess formed by a cover coupled to the one of the inner wall and the outer wall within the interior space, the cover having at least one opening for the cord.

18. The vehicle of claim 14, wherein the retraction mechanism includes flanges that are received within retention tabs coupled to the one of the inner wall and the outer wall within the interior space.

19. The vehicle of claim 14, wherein at least one of the inner wall and the outer wall is configured to accommodate the retraction mechanism.

20. The vehicle of claim 14, wherein the retraction mechanism is hidden from view when mounted to one of the inner wall and the outer wall within the interior space.

* * * * *